(12) United States Patent
Ma et al.

(10) Patent No.: US 12,394,789 B2
(45) Date of Patent: Aug. 19, 2025

(54) METAL ANODE, METHOD FOR PREPARING THE METAL ANODE, AND SECONDARY BATTERY

(71) Applicant: Huawei Technologies Co., Ltd., Shenzhen (CN)

(72) Inventors: Qiang Ma, Shenzhen (CN); Haobin Wu, Hangzhou (CN); Zhengjie Li, Shenzhen (CN); Yifei Xu, Hangzhou (CN); Xiang Hong, Shenzhen (CN); Pinghua Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 716 days.

(21) Appl. No.: 17/574,193

(22) Filed: Jan. 12, 2022

(65) Prior Publication Data

US 2022/0140326 A1    May 5, 2022

Related U.S. Application Data

(63) Continuation of application No. PCT/CN2020/101482, filed on Jul. 10, 2020.

(30) Foreign Application Priority Data

Jul. 12, 2019    (CN) .......................... 201910632088.1

(51) Int. Cl.
*H01M 4/40*       (2006.01)
*H01M 4/04*       (2006.01)
(Continued)

(52) U.S. Cl.
CPC ......... *H01M 4/405* (2013.01); *H01M 4/0409* (2013.01); *H01M 4/628* (2013.01); *H01M 10/0569* (2013.01); *H01M 2300/0042* (2013.01)

(58) Field of Classification Search
CPC .... H01M 4/405; H01M 4/0409; H01M 4/628; H01M 10/0569; H01M 2300/0042;
(Continued)

(56) References Cited

U.S. PATENT DOCUMENTS 10,290,898 B2    5/2019   Choi et al.
10,847,799 B2*   11/2020  Lee ................... H01M 10/4235
(Continued)

FOREIGN PATENT DOCUMENTS

CN    102738510 A    10/2012
CN    105070946 A    11/2015
(Continued)

OTHER PUBLICATIONS

Yuan Changfu, et al, "Li-transfer promotion and interface stabilization of MOF-5 on PEO-based polymer electrolyte," Journal of Central South University (Science and Technology), vol. 46, No. 4, Apr. 2015, with an English Abstract, 20 pages.

*Primary Examiner* — Abdullah A Riyami
*Assistant Examiner* — Nader J Alhawamdeh
(74) *Attorney, Agent, or Firm* — Conley Rose, P.C.

(57) ABSTRACT

A metal anode including a metal anode body and a protective layer formed on one or two side surfaces of the metal anode body. The protective layer includes a coordination polymer having an unsaturated metal site or a complexation product formed by complexation between the coordination polymer having the unsaturated metal site and anions of battery electrolyte salt. The coordination polymer uses zirconium, aluminum, or iron as a center and uses R—$X_n$ as an organic ligand, R is n-valent hydrocarbyl, substituted hydrocarbyl, or hydrocarboxy, n is an integer in a range of 1 to 4, X is an oxygen-containing functional group capable of forming metal-oxygen chemical bond with the metal anode body, and the metal-oxygen chemical bond is formed between metal
(Continued)

atoms on a surface of the metal anode body and oxygen atoms in the X group.

20 Claims, 7 Drawing Sheets

(51) Int. Cl.
*H01M 4/62* (2006.01)
*H01M 10/0569* (2010.01)

(58) Field of Classification Search
CPC .. H01M 2004/027; H01M 4/38; H01M 4/382; H01M 4/134; H01M 4/1395; H01M 4/366; H01M 4/381; H01M 4/386; H01M 4/387; H01M 4/463; H01M 4/21; H01M 10/052; H01M 10/054; H01M 10/0525; H01M 2004/021; H01M 2220/30; Y02E 60/10
See application file for complete search history.

(56) References Cited

U.S. PATENT DOCUMENTS

| | | | | |
|---|---|---|---|---|
| 2001/0031367 | A1* | 10/2001 | Gilbert | B32B 7/12 |
| | | | | 205/717 |
| 2013/0337337 | A1* | 12/2013 | Lee | H01M 10/052 |
| | | | | 429/317 |
| 2015/0064552 | A1* | 3/2015 | Huang | H01M 4/0419 |
| | | | | 429/212 |
| 2016/0064773 | A1 | 3/2016 | Choi et al. | |
| 2016/0087263 | A1* | 3/2016 | Gadkaree | B22F 1/102 |
| | | | | 429/231.95 |
| 2016/0329567 | A1* | 11/2016 | Lee | H01M 10/0569 |
| 2016/0336625 | A1 | 11/2016 | Jeong et al. | |
| 2017/0317352 | A1* | 11/2017 | Lee | H01M 10/0569 |
| 2017/0324097 | A1 | 11/2017 | Lee et al. | |
| 2018/0316051 | A1 | 11/2018 | Lee et al. | |
| 2020/0144599 | A1* | 5/2020 | Lee | H01M 4/602 |
| 2020/0350386 | A1* | 11/2020 | Chu | H10K 50/86 |
| 2021/0264829 | A1* | 8/2021 | Takatori | G09G 3/3233 |
| 2022/0093908 | A1* | 3/2022 | Ritchie | H01M 50/414 |
| 2022/0093969 | A1* | 3/2022 | Ma | H01M 50/449 |
| 2022/0140326 | A1* | 5/2022 | Ma | H01M 10/0569 |
| | | | | 429/209 |
| 2022/0336817 | A1* | 10/2022 | Roev | C01B 32/174 |
| 2022/0416235 | A1* | 12/2022 | Kim | H01M 4/366 |

FOREIGN PATENT DOCUMENTS

| | | |
|---|---|---|
| CN | 106025230 A | 10/2016 |
| CN | 106159313 A | 11/2016 |
| CN | 107359309 A | 11/2017 |
| CN | 107394115 A | 11/2017 |
| CN | 107808944 A | 3/2018 |
| CN | 108807851 A | 11/2018 |
| EP | 3136475 A1 | 3/2017 |

* cited by examiner

METAL ANODE, METHOD FOR PREPARING THE METAL ANODE, AND SECONDARY BATTERY

CROSS-REFERENCE TO RELATED APPLICATIONS

This is a continuation of International Patent Application No. PCT/CN2020/101482 filed on Jul. 10, 2020, which claims priority to Chinese Patent Application No. 201910632088.1 filed on Jul. 12, 2019. The disclosures of the aforementioned applications are hereby incorporated by reference in their entireties.

TECHNICAL FIELD

Embodiments of the present disclosure relate to the field of secondary battery technologies, and in particular, to a metal anode, a method for preparing the metal anode, and a secondary battery.

BACKGROUND

With the development of economy and technology, in industries from portable electronic devices (mobile phones, tablet computers, and notebook computers) to drones and electric vehicles, there is an urgent need for energy storage devices with higher energy density, higher power density, longer cycling life, and higher safety. However, energy density of a lithium ion battery based on a conventional graphite anode is close to the upper limit, and cannot meet people's increasing demand for battery life and standby time. Lithium metal has a high theoretical specific capacity (3860 milliampere hours per gram (mAh/g)) and a lowest negative electrochemical potential (−3.040 volts (V) vs. standard hydrogen electrode (SHE)). Use of a lithium metal anode can greatly improve the energy density of the lithium battery and significantly improve user experience. However, the lithium metal has characteristics such as high chemical activity (resulting in low coulombic efficiency), growth of lithium dendrite (causing side reactions and potential risks), and large volume expansion (constant rupture and reconstruction of solid-electrolyte interphases (SEIs)), which hinder commercialization of the lithium metal battery with high energy density.

Researches show that when a stable interface is constructed on a surface of the lithium anode in a physical or chemical manner, surface activity of the lithium anode can be reduced, lithium ion flows can be homogenized, the growth of lithium dendrite can be alleviated, and the volume expansion can also be alleviated. However, currently there is no stable interface construction solution that is effective and can achieve mass production.

SUMMARY

In view of this, embodiments of the present disclosure provide a metal anode. There is a protective layer on a surface of the metal anode. The protective layer can effectively inhibit dendrite growth, reduce occurrences of side reactions, and alleviate impact caused by volume expansion of the metal anode in a cycle process, to resolve problems of high reactivity, dendrite growth, and large volume expansion of the existing metal anode to some extent.

Further, a first aspect of the embodiments of the present disclosure provides a metal anode. The metal anode includes a metal anode body and a protective layer formed on one or two side surfaces of the metal anode body. The protective layer includes a coordination polymer having an unsaturated metal site or a complexation product formed by complexation between the coordination polymer having the unsaturated metal site and anions of battery electrolyte salt. The coordination polymer having the unsaturated metal site uses zirconium (Zr), aluminum (Al), or iron (Fe) as a metal center and uses R—$X_n$ as an organic ligand, R is n-valent hydrocarbyl, substituted hydrocarbyl, or hydrocarboxy, n is an integer in a range of 1 to 4, X is an oxygen-containing functional group capable of forming metal-oxygen chemical bond with the metal anode body, and the metal-oxygen chemical bond is formed between metal atoms on a surface of the metal anode body and oxygen atoms in the X group.

In an implementation of the present disclosure, X may be carboxyl or sulfonyl.

In an implementation of the present disclosure, R is hydrocarbyl, substituted hydrocarbyl, or hydrocarboxy with 1 to 20 carbon atoms.

In an implementation of the present disclosure, R is selected from any one of alkyl, alkylene, haloalkyl, haloalkylene, alkoxy, alkoxylene, haloalkoxy, haloalkoxylene, alkenyl, alkenylene, haloalkenyl, haloalkenylene, enoxy, enoxylene, haloenoxy, halogenated enoxylene, aryl, arylene, haloaryl, haloarylene, aryloxy, aryloxylene, haloaryloxy, or haloaryloxylene.

In an implementation of the present disclosure, the metal anode body includes a lithium anode, a sodium anode, a potassium anode, a magnesium anode, a zinc anode, and an aluminum anode.

In an implementation of the present disclosure, the lithium anode includes at least one of lithium metal, a lithium silicon alloy, a lithium aluminum alloy, a lithium tin alloy, or a lithium indium alloy.

In an implementation of the present disclosure, the anions of the battery electrolyte salt include at least one of hexafluorophosphate anions ($PF_6^-$), hexafluoroarsenate anions ($AsF_6^-$), perchlorate anions ($ClO_4^-$), tetrafluoroborate anions ($BF_4^-$), dioxalate borate anions ($B(C_2O_4)_2^-$, BOB$^-$), difluoroacetic acid borate anions ($BF_2C_2O_4^-$, DFOB$^-$), bisfluorosulfonimide anions (FSI$^-$), bistrifluorosulfonimide anions (TFSI$^-$), or the anions complex with the unsaturated metal site of the coordination polymer.

In an implementation of the present disclosure, the protective layer further includes a binder.

In an implementation of the present disclosure, a thickness of the protective layer is 0.1 micrometers (μm) to 30 μm.

According to the metal anode provided in the first aspect of the embodiments of the present disclosure, the coordination polymer and/or the protective layer formed by complexation between the coordination polymer and the anions of the battery electrolyte salt are constructed on the surface of the metal anode body, to reduce movements of anions, increase a transference number of metal cations (for example, lithium ions), reduce concentration polarization on the surface of the metal anode, effectively adjust deposition/dissolution of metal ions of the metal anode, and inhibit dendrite formation. In addition, the carboxyl or sulfonyl in the coordination polymer forms the metal-oxygen chemical bond with the metal anode, so that the interface protective layer can be effectively stabilized, and impact caused by volume expansion of the metal anode in a cycle process can be alleviated. In addition, the protective layer can further isolate direct contact between a liquid electrolyte and the metal anode, to reduce side reactions, and improve coulombic efficiency of the anode.

According to a second aspect, an embodiment of the present disclosure further provides a method for preparing a metal anode, including forming a protective layer on one or two side surfaces of a metal anode body, where the protective layer includes a coordination polymer having an unsaturated metal site or a complexation product formed by complexation between the coordination polymer having the unsaturated metal site and anions of battery electrolyte salt, where the coordination polymer having the unsaturated metal site uses zirconium (Zr), aluminum (Al), or iron (Fe) as a metal center and uses R—$X_n$ as an organic ligand, R is n-valent hydrocarbyl, substituted hydrocarbyl, or hydrocarboxy, n is an integer in a range of 1 to 4, and X is an oxygen-containing functional group capable of forming metal-oxygen chemical bond with the metal anode body, and the metal-oxygen chemical bond is formed between metal atoms on a surface of the metal anode body and oxygen atoms in the X group.

In an implementation of the present disclosure, X may be carboxyl or sulfonyl.

In an implementation of the present disclosure, when the protective layer includes the coordination polymer having the unsaturated metal site, a specific operation of forming the protective layer on the one or two side surfaces of the metal anode body is: coating a solution containing the coordination polymer having the unsaturated metal site onto the surface of the metal anode body, where the metal-oxygen chemical bond is formed between the metal atoms on the surface of the metal anode body and the oxygen atoms in the X group in the coordination polymer.

In an implementation of the present disclosure, when the protective layer includes the complexation product formed by the complexation between the coordination polymer having the unsaturated metal site and the anions of the battery electrolyte salt, a specific operation of forming the protective layer on the one or two side surfaces of the metal anode body is: coating a solution containing the coordination polymer having the unsaturated metal site onto the surface of the metal anode body, where the metal-oxygen chemical bond is formed between the metal atoms on the surface of the metal anode body and the oxygen atoms in the X group in the coordination polymer, and then coating a solution containing the battery electrolyte salt onto the coordination polymer, where the coordination polymer complexes with the anions of the battery electrolyte salt to form the complexation product.

In an implementation of the present disclosure, the solution containing the coordination polymer having the unsaturated metal site is prepared by using a first non-aqueous organic solvent. The first non-aqueous organic solvent includes one or more of tetrahydrofuran, dimethyl ether, dimethyl sulfide, 1,3-dioxolan, 1,4-dioxane, 1,2-dimethoxyethane, ethylene glycol dimethyl ether, bis-trifluoroethyl, hexafluoroisopropyl methyl ether, hexafluoroisopropyl ethyl ether, methyl perfluorobutyl ether, ethyl perfluorobutyl ether, 1,1,2,2-tetrafluoroethyl-2,2,3,3-tetrafluoropropylether, and 1H, 1H, 5H-perfluoropentyl-1,1,2,2-tetrafluoroethylether.

In an implementation of the present disclosure, the solution containing the battery electrolyte salt is prepared by using a second non-aqueous organic solvent, and the second non-aqueous organic solvent includes one or more of a carbonate solvent, an ether solvent, and a carboxylate solvent. The second non-aqueous organic solvent may be obtained by mixing the foregoing three solvents based on any ratio. The carbonate solvent includes cyclic carbonate or chain carbonate, the cyclic carbonate may be one or more of ethylene carbonate (EC), propylene carbonate (PC), γ-butyrolactone (GBL), butylene carbonate (BC), fluoroethylene carbonate (FEC), and vinylene carbonate (VC), and the chain carbonate may be one or more of dimethyl carbonate (DMC), ethyl methyl carbonate (EMC), diethyl carbonate (DEC), and dipropyl carbonate (DPC). The ether solvent includes cyclic ether or chain ether, the cyclic ether may be further one or more of 1,3-dioxolane (DOL), 1,4-dioxane (DX), crown, tetrahydrofuran (THF), 2-methyltetrahydrofuran (2-$CH_3$-THF), and 2-trifluoromethyl tetrahydrofuran (2-$CF_3$-THF), and the chain ether may be further one or more of dimethoxymethane (DMM), 1,2-dimethoxyethane (DME), and diethylene glycol dimethyl ether (TEGDME). The carboxylate solvent may further be one or more of methyl acetate (MA), ethyl acetate (EA), propyl acetate (EP), butyl acetate, propyl acetate (PP), and butyl propionate.

In an implementation of the present disclosure, a manner of the coating includes at least one of drip coating, brush coating, roll coating, spray coating, slit coating, dip coating, and spin coating, or the coating operation is performed in a dry room or in a protective atmosphere. In an implementation of the present disclosure, coating is performed for duration of 1 min to 24 h and at a temperature of −10 degrees Celsius (° C.) to 50° C.

The method for preparing a metal anode provided in the second aspect of the embodiments of the present disclosure has a simple process, and can achieve mass production.

An embodiment of the present disclosure further provides a secondary battery, including an anode electrode film, an anode electrode film, a separator, and a liquid electrolyte, where the anode electrode film includes the metal anode in the first aspect of the embodiments of the present disclosure. The secondary battery has high cycle performance and high safety.

An embodiment of the present disclosure further provides a terminal. The terminal includes the foregoing secondary battery provided in the embodiments of the present disclosure, and the secondary battery is configured to supply power to the terminal. The terminal may be an electronic product such as a mobile phone, a tablet computer, or a smart wearable product.

DESCRIPTION OF EMBODIMENTS

The following describes the embodiments of the present disclosure with reference to the accompanying drawings in the embodiments of the present disclosure.

Figure 1:
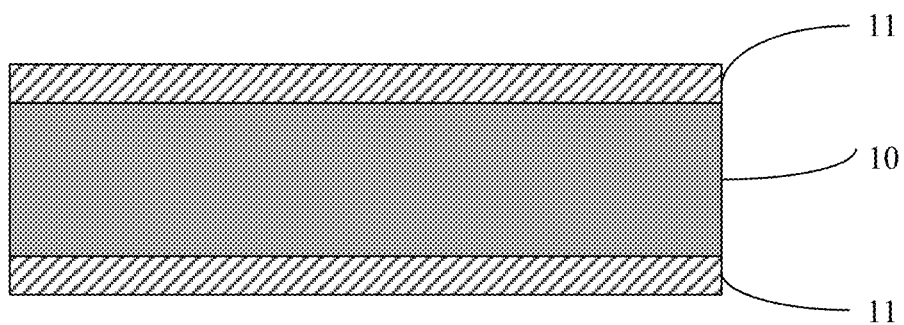
FIG. 1 and FIG. 2 are schematic diagrams of a structure of a metal anode according to an embodiment of the present disclosure.
Figure 2:
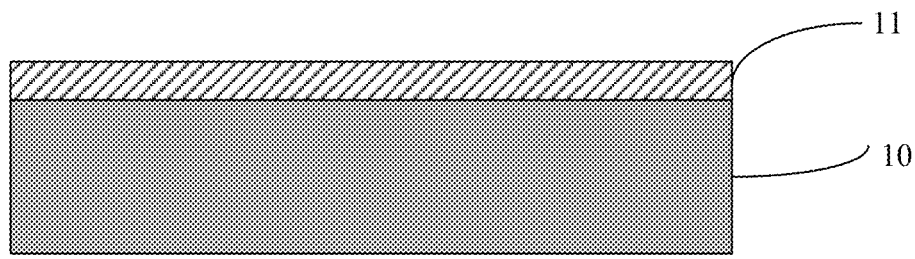

Refer to FIG. 1 and FIG. 2, an embodiment of the present disclosure provides a metal anode. The metal anode includes a metal anode body 10 and a protective layer 11 formed on one or two side surfaces of the metal anode body 10. The protective layer 11 includes a coordination polymer having an unsaturated metal site and/or a complexation product formed by complexation between the coordination polymer having the unsaturated metal site and anions of battery electrolyte salt. The coordination polymer having the unsaturated metal site uses zirconium (Zr), aluminum (Al), or iron (Fe) as a metal center and uses R—$X_n$ as an organic ligand, R is n-valent hydrocarbyl, substituted hydrocarbyl, or hydrocarboxy, n is an integer in a range of 1 to 4, X is an oxygen-containing functional group capable of forming metal-oxygen chemical bond with the metal anode body 10, and the metal-oxygen chemical bond is formed between metal atoms on a surface of the metal anode body 10 and oxygen atoms in the X group, so that the protective layer 11 can firmly bind to the metal anode body 10.

In an implementation of the present disclosure, the X group is an oxygen-containing functional group capable of forming the metal-oxygen chemical bond with the metal anode body 10, and may be carboxyl or sulfonyl.

Figure 3:
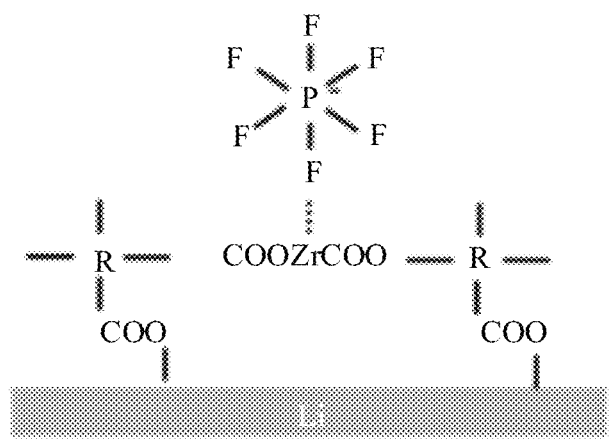
FIG. 3 is a schematic diagram of chemical bond between a protective layer of a lithium anode and a lithium anode body according to an embodiment of the present disclosure.

In an implementation of the present disclosure, the metal anode body 10 may be a lithium anode, a sodium anode, a potassium anode, a magnesium anode, a zinc anode, or an aluminum anode. Using the lithium anode as an example, in an embodiment of the present disclosure, the protective layer 11 includes the coordination polymer having the unsaturated metal site. As shown in FIG. 3, the coordination polymer may bond with the surface of the lithium anode by using the lithium-philic group X (carboxyl or sulfonyl) in the organic ligand, to form a Li—O chemical bond. This is beneficial for stabilizing the interface protective layer and alleviating impact caused by volume expansion of the lithium anode in a cycle process. When the lithium anode is assembled into a battery, the coordination polymer having the unsaturated metal site in the protective layer 11 is an organic-inorganic coordination polymer whose Lewis acidic metal site can complex with anions (for example, $PF_6^-$) in a liquid electrolyte, to reduce movements of the anions, increase a transference number of lithium ions, reduce concentration polarization on the surface of the electrode, effectively adjust deposition/dissolution of the lithium ions of the lithium anode, and inhibit growth of lithium dendrite. In addition, the protective layer 11 may further isolate direct contact between the liquid electrolyte and the metal anode, to reduce side reactions, and improve coulombic efficiency of the anode. The protective layer 11 is disposed to finally improve cycle performance and safety of the battery.

In another embodiment of the present disclosure, the protective layer 11 may alternatively include the complexation product formed by the complexation between the coordination polymer having the unsaturated metal site and the anions of the battery electrolyte salt. To be specific, before battery assembly, the coordination polymer having the unsaturated metal site pre-complex with the anions of the battery electrolyte salt, to form the complexation product, thereby constituting the stable protective layer.

Certainly, in another embodiment of the present disclosure, the protective layer 11 may alternatively include both the organic-inorganic coordination polymer having the unsaturated metal site and the complexation product formed by the complexation between the coordination polymer having the unsaturated metal site and the anions of the battery electrolyte salt. To be specific, before battery assembly, some coordination polymers having the unsaturated metal site pre-complex with the anions of the battery electrolyte salt, and the other coordination polymers having the unsaturated metal site still exist in an original form in the protective layer.

In an implementation of the present disclosure, the lithium anode, the sodium anode, the potassium anode, the magnesium anode, the zinc anode, and the aluminum anode may be pure metal lithium, sodium, potassium, magnesium, zinc, and aluminum or alloys thereof, or may be the foregoing metal or alloys thereof having current collectors. Using the lithium anode as an example, the lithium anode may be pure lithium metal or a lithium alloy, or may be lithium metal or a lithium alloy including current collectors and disposed on the current collectors. Further, the lithium anode may include at least one of lithium metal, a lithium silicon alloy, a lithium aluminum alloy, a lithium tin alloy, or a lithium indium alloy. The current collector may be copper foil.

In an implementation of the present disclosure, the coordination polymer having the unsaturated metal site may use zirconium (Zr), aluminum (Al), or iron (Fe) as the metal center and use R—$X_n$ as the organic ligand, R is n-valent hydrocarbyl, substituted hydrocarbyl, or hydrocarboxy, n is an integer in a range of 1 to 4, and X is carboxyl or sulfonyl. Further, R may be 1-valent, 2-valent, 3-valent, or 4-valent hydrocarbyl, substituted hydrocarbyl, or hydrocarboxy. For example, R may be hydrocarbyl, substituted hydrocarbyl, or hydrocarboxy having 1 to 20 carbon atoms. Furthermore, R may be any one of alkyl, alkylene, haloalkyl, haloalkylene, alkoxy, alkoxylene, haloalkoxy, haloalkoxylene, alkenyl, alkenylene, haloalkenyl, haloalkenylene, enoxy, enoxylene, haloenoxy, halogenated enoxylene, aryl, arylene, haloaryl, haloarylene, aryloxy, aryloxylene, haloaryloxy, and haloaryloxylene. The alkyl, alkylene, haloalkyl, haloalkylene, alkoxy, alkoxylene, haloalkoxy, and haloalkoxylene have 1 to 20 carbon atoms, further, 1 to 8 carbon atoms. The alkenyl, alkenylene, haloalkenyl, haloalkenylene, enoxy, enoxylene, haloenoxy, and halogenated enoxylene have 2 to 20 carbon atoms, further, 2 to 8 carbon atoms. The aryl, arylene, haloaryl, haloarylene, aryloxy, aryloxylene, haloaryloxy, and haloaryloxylene have 6 to 20 carbon atoms, further, 6 to 10 carbon atoms. Halogens in the haloalkyl, haloalkylene, haloalkoxy, haloalkoxylene, haloalkenyl, haloalkenylene, haloenoxy, halogenated enoxylene, haloaryl, haloarylene, haloaryloxy, and haloaryloxylene include fluorine, chlorine, bromine, and iodine, and the halogenation is complete halogenation or partial halogenation.

In an implementation of the present disclosure, the coordination polymer having the unsaturated metal site may include one organic ligand, or may include two or more different organic ligands, and may include only carboxyl or sulfonyl, or may include both carboxyl or sulfonyl.

In an implementation of the present disclosure, the anions of the battery electrolyte salt may be anions of battery electrolyte salt in a currently common battery liquid electrolyte, including but not limited to one or more of hexafluorophosphate anions ($PF_6^-$), hexafluoroarsenate anions ($AsF_6^-$), perchlorate anions ($ClO_4^-$), tetrafluoroborate anions ($BF_4^-$), dioxalate borate anions ($B(C_2O_4)_2^-$, $BOB^-$), difluoroacetic acid borate anions ($BF_2C_2O_4^-$, $DFOB^-$), bisfluorosulfonimide anions ($FSI^-$), and bistrifluorosulfonimide anions ($TFSI^-$). The anions of the electrolyte salt form complexation with the unsaturated metal site of the coordination polymer.

In an implementation of the present disclosure, a thickness of the protective layer 11 may be 0.1 μm to 30 μm. Further, the thickness of the protective layer 11 may be in a range of 5 μm to 15 μm. If the thickness of the protective layer is excessively small, stability is poor and a protection effect is poor. If the thickness is excessively large, battery performance may be affected.

In an implementation of the present disclosure, the protective layer 11 may further include a binder. A mass ratio of the coordination polymer having the unsaturated metal site or the complexation product formed by the complexation between the coordination polymer having the unsaturated metal site and the anions of the battery electrolyte salt to the binder is 1:1 to 100:1. The binder includes but is not limited to one or more of polyvinylidene fluoride (PVDF), polymethylmethacrylate (PMMA), polytetrafluoroethylene (PTFE), polyvinylidene fluoride-hexafluoropropylene (PVDF-HFP), polyacrylonitrile (PAN), polyimide (PI), polyethyleneglycol (PEG), polyethylene oxide (PEO), polydopamine (PDA), carboxymethyl cellulose/styrenebutadiene rubber (CMC/SBR), polyvinyl alcohol (PVA), polyacrylic acid (PAA), poly(lithium acrylate) (LiPAA), polyvinylpyrrolidone (PVP), polylactic acid (PLA), sodium alginate (SA), poly(4-styrenesulfonic acid) (PSS), poly (lithium-p-styrenesulfonate) (LiPSS), and gelatin.

Correspondingly, an embodiment of the present disclosure further provides a method for preparing the foregoing metal anode, including forming a protective layer on one or two side surfaces of a metal anode body, where the protective layer includes a coordination polymer having an unsaturated metal site or a complexation product formed by complexation between the coordination polymer having the unsaturated metal site and anions of battery electrolyte salt, where the coordination polymer having the unsaturated metal site uses zirconium (Zr), aluminum (Al), or iron (Fe) as a metal center and uses $R-X_n$ as an organic ligand, R is n-valent hydrocarbyl, substituted hydrocarbyl, or hydrocarboxy, n is an integer in a range of 1 to 4, and X is carboxyl or sulfonyl, and the carboxyl or sulfonyl forms a metal-oxygen chemical bond with the metal anode body. X is an oxygen-containing functional group capable of forming the metal-oxygen chemical bond with the metal anode body, and the metal-oxygen chemical bond is formed between metal atoms on a surface of the metal anode body and oxygen atoms in the X group.

In an implementation of the present disclosure, X may be carboxyl or sulfonyl.

In an implementation of the present disclosure, when the protective layer includes the coordination polymer having the unsaturated metal site, a specific operation of forming the protective layer on the one or two side surfaces of the metal anode body may be: coating a solution containing the coordination polymer having the unsaturated metal site onto the surface of the metal anode body, where the metal-oxygen chemical bond is formed between the metal atoms on the surface of the metal anode body and the oxygen atoms of the carboxyl or sulfonyl in the coordination polymer. When the metal anode is assembled into a battery and when a liquid electrolyte is poured, a Lewis acidic metal site of the coordination polymer having the unsaturated metal site in the protective layer can complex with the anions of the electrolyte salt in the liquid electrolyte, to form the complexation product.

In another implementation of the present disclosure, when the protective layer includes the complexation product formed by the complexation between the coordination polymer having the unsaturated metal site and the anions of the battery electrolyte salt, a specific operation of forming the protective layer on the one or two side surfaces of the metal anode body may be: coating a solution containing the coordination polymer having the unsaturated metal site onto the surface of the metal anode body, where the metal-oxygen chemical bond is formed between the metal atoms on the surface of the metal anode body and the oxygen atoms of the carboxyl or sulfonyl in the coordination polymer, and then coating a solution containing the battery electrolyte salt onto the coordination polymer, so that the coordination polymer complexes with the anions of the electrolyte salt to form the complexation product. In this implementation, when the coordination polymer coated onto the surface of the metal anode body does not completely complex with the anions of the electrolyte salt, the protective layer may include both the coordination polymer having the unsaturated metal site and the complexation product formed by the complexation between the coordination polymer having the unsaturated metal site and the anions of the battery electrolyte salt.

In an implementation of the present disclosure, the solution containing the coordination polymer having the unsaturated metal site is prepared by using a first non-aqueous organic solvent. The first non-aqueous organic solvent includes one or more of tetrahydrofuran, dimethyl ether, dimethyl sulfide, 1,3-dioxolan, 1,4-dioxane, 1,2-dimethoxyethane, ethylene glycol dimethyl ether, bis-trifluoroethyl, hexafluoroisopropyl methyl ether, hexafluoroisopropyl ethyl ether, methyl perfluorobutyl ether, ethyl perfluorobutyl ether, 1,1,2,2-tetrafluoroethyl-2,2,3,3-tetrafluoropropylether, and 1H, 1H, 5H-perfluoropentyl-1,1,2,2-tetrafluoroethylether. In a solution containing the coordination polymer having the unsaturated metal site, a mixing ratio of the coordination polymer having the unsaturated metal site to the first non-aqueous organic solvent may be 1:1 to 1:100. The coordination polymer having the unsaturated metal site may be completely dissolved in the foregoing organic solvent, or maybe not completely dissolved. Therefore, the solution containing the coordination polymer having the unsaturated metal site in this application may be a homogeneous solution or a suspension.

In an implementation of the present disclosure, a solution containing an electrolyte is prepared by using a second non-aqueous organic solvent, and the second non-aqueous organic solvent includes one or more of a carbonate solvent, an ether solvent, and a carboxylate solvent. The second non-aqueous organic solvent may be obtained by mixing the foregoing three solvents based on any ratio. The carbonate solvent includes cyclic carbonate or chain carbonate, the cyclic carbonate may be one or more of ethylene carbonate (EC), propylene carbonate (PC), γ-butyrolactone (GBL), butylene carbonate (BC), fluoroethylene carbonate (FEC), and vinylene carbonate (VC), and the chain carbonate may be one or more of dimethyl carbonate (DMC), ethyl methyl carbonate (EMC), diethyl carbonate (DEC), and dipropyl carbonate (DPC). The ether solvent includes cyclic ether or chain ether, the cyclic ether may be one or more of 1,3-dioxolane (DOL), 1,4-dioxane (DX), crown, tetrahydrofuran (THF), 2-methyltetrahydrofuran (2-$CH_3$-THF), and 2-trifluoromethyl tetrahydrofuran (2-$CF_3$-THF), and the chain ether may be one or more of dimethoxymethane (DMM), 1,2-dimethoxyethane (DME), and diethylene glycol dimethyl ether (TEGDME). The carboxylate solvent may further be one or more of methyl acetate (MA), ethyl acetate (EA), propyl acetate (EP), butyl acetate, propyl acetate (PP), and butyl propionate.

In an implementation of the present disclosure, the solution containing the electrolyte may directly use a battery liquid electrolyte.

In an implementation of the present disclosure, a specific manner of the coating is not limited, and may be any one or a combination of a plurality of manners: drip coating, brush coating, roll coating, spray coating, slit coating, dip coating, and spin coating, and the coating operation may be performed in a dry room or in a protective atmosphere. Coating duration and temperature may be set based on an actual requirement, specific coating duration may be 1 min to 24 h, and the coating temperature may be −10° C. to 50° C. A thickness of a coating layer may be 0.1 μm to 30 μm.

In an implementation of the present disclosure, a thickness of the protective layer finally formed on the metal anode body is determined by parameters such as a coating solution concentration and coating duration. Further, the thickness of the protective layer may be 0.1 μm to 30 μm. Further, the thickness of the protective layer may be 5 μm to 15 μm.

The method for preparing a metal anode provided in this embodiment of the present disclosure has a simple process, and can achieve mass production.

An embodiment of the present disclosure further provides a secondary battery, including an anode electrode film, an anode electrode film, a separator, and a liquid electrolyte, where the anode electrode film includes the foregoing metal anode in the embodiments of the present disclosure. The metal anode may be a lithium anode, a sodium anode, a potassium anode, a magnesium anode, a zinc anode, or an aluminum anode. Correspondingly, the secondary battery may be a lithium secondary battery, a sodium secondary battery, a potassium secondary battery, or the like. The secondary battery has high cycle performance and high safety.

Figure 4:
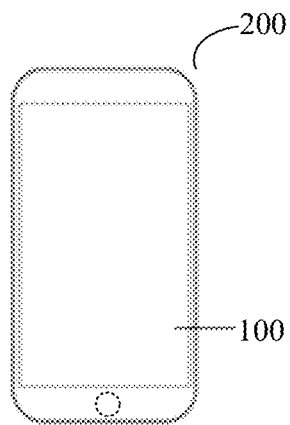
FIG. 4 is a schematic diagram of a structure of a terminal according to an embodiment of the present disclosure.

As shown in FIG. 4, an embodiment of the present disclosure further provides a terminal 200. The terminal 200 may be an electronic product such as a mobile phone, a tablet computer, or a smart wearable product. The terminal 200 includes a housing 100 assembled outside the terminal, and a circuit board and a battery (not shown in the figure) that are located inside the housing 100. The battery is the foregoing secondary battery provided in the embodiments of the present disclosure. The housing 100 may include a display screen assembled on a front side of the terminal and a rear cover assembled on a rear side of the terminal. The battery may be fixed on an inner side of the rear cover to supply power to the terminal 200.

A plurality of embodiments of the present disclosure is described below.

Embodiment 1

Preparation of a lithium metal anode, including the following:

(1) Preparation of a coordination polymer having an unsaturated metal site: dissolving 0.80 grams (g) of zirconium chloride, 0.57 g of terephthalic acid, and 4.2 g of benzoic acid into 100 milliliters (mL) of N, N-dimethylformamide (DMF), performing magnetic stirring for 30 min and ultrasonication for 15 minute (min), then transferring the solution to a reaction kettle for sealing and performing thermal insulation at 120° C. for 24 hours (h), after a temperature of the reaction kettle is reduced to room temperature, performing centrifugation at 9000 revolutions/minute for 3 min, to obtain a white solid product, and washing the product by using DMF for three times, and subsequently replacing a solvent with methanol for three days, and finally heating (350° C.) and activating the sample in vacuum to obtain 0.74 g of a powder sample A, namely, a coordination polymer A with zirconium (Zr) as a metal center and terephthalic acid as an organic ligand.

(2) Preparation of a lithium anode protected by A: dispersing 0.20 g of the foregoing powder A into 10 mL of ethylene glycol dimethyl ether in a dry room, and performing stirring and mixing to obtain homogeneous slurry, then, coating the foregoing homogeneous slurry onto a surface of unprotected lithium metal through drip coating, where the drip coating is performed for 10 min, and the lithium anode whose protective layer A has a thickness of 8 μm is obtained after solvent drying (the thickness is related to a solution concentration, the drip coating duration, and a preparation method).

(3) Lithium cobaltate/Lithium ($LiCoO_2$/Li) battery assembly: assembling the foregoing prepared protected lithium anode, a lithium cobaltate anode, and a separator into a button cell, and dropwise adding 50 microliters (μL) of 1.0 moles per liter (mol/L) $LiPF_6$ liquid electrolyte (a weight ratio among DMC, FEC, and VC is 45:52:3), where the unsaturated metal site of the coordination polymer A in the protective layer complexes with anions $PF_6^-$ the liquid electrolyte, to form a complexation product, and a stable protective layer with a thickness of 8 μm is further obtained.

Embodiment 2

Preparation of a lithium aluminum alloy anode, including the following:

(1) Preparation of powder B: dispersing 1.43 g of aluminum nitrate nonahydrate and 1.21 g of trimethyl 1,3,5-benzene triformic acid into 20 mL of water and adding 4 mL of concentrated nitric acid to it, transferring the mixed solution to a microwave reactor, heating the mixed solution to 240° C. (6 min) at 1500 watts (W), and performing thermal insulation for 1 minute, subsequently, performing collection through centrifugation and performing washing with water for three times, and finally heating and activating the sample in vacuum at 350° C., to obtain 0.85 g of a powder sample B, namely, a coordination polymer B with aluminum (Al) as a metal center and trimethyl 1,3,5-benzene triformic acid as an organic ligand.

(2) Preparation of a lithium anode protected by B: dispersing 0.3 g of the foregoing powder B into 20 mL of dimethyl ether in a dry room, and performing stirring and mixing to obtain homogeneous slurry, then, coating the foregoing homogeneous slurry onto a surface of an unprotected lithium aluminum alloy through slit coating, where the coating (slit coating) is performed for 8 min, and the lithium aluminum alloy anode whose protective layer B has a thickness of 10 μm is obtained after solvent drying (the thickness is related to a solution concentration, the slit coating duration, and a preparation method).

(3) $LiCoO_2$/Li battery assembly: assembling the foregoing prepared protected lithium aluminum alloy anode, a lithium cobaltate anode, and a separator into a button cell, and dropwise adding 50 μL of 1.0 mol/L $LiPF_6$ liquid electrolyte (a weight ratio among DMC, FEC, and VC is 45:52:3), where the unsaturated metal site of the coordination polymer B in the protective layer complexes with anions $PF_6^-$ the liquid electrolyte, to form a complexation product, and a stable protective layer with a thickness of 10 µm is further obtained.

Embodiment 3

Preparation of a lithium metal anode, including the following:

(1) Preparation of powder C: dispersing 2.43 g of ferric nitrate nonahydrate and 0.84 g of trimesic acid into 30 mL of water, and adding 4 mL of concentrated nitric acid to it, transferring the mixed solution to a microwave reactor, heating the mixed solution to 130° C. (3 min) at 1500 W, and performing thermal insulation for 5 minutes, subsequently, performing collection through centrifugation and performing washing with water for three times, and finally heating and activating the sample in vacuum at 200° C., to obtain 0.91 g of a powder sample C, namely, a coordination polymer C with iron (Fe) as a metal center and trimesic acid as an organic ligand.

(2) Preparation of a lithium anode protected by C: dispersing 0.25 g of the powder C into 20 mL of methyl perfluorobutyl ether in a dry room, and performing stirring and mixing to obtain homogeneous slurry, then, coating the foregoing homogeneous slurry onto a surface of unprotected lithium metal through brush coating, where the coating (brush coating) is performed for 15 min, and the lithium metal anode whose protective layer C has a thickness of 13 µm is obtained after solvent drying (the thickness is related to a solution concentration, the scrabing coating duration, and a preparation method).

(3) $LiCoO_2$/Li battery assembly: assembling the foregoing prepared protected lithium metal anode, a lithium cobaltate anode, and a separator into a button cell, and dropwise adding 50 µL of 1.0 mol/L $LiPF_6$ liquid electrolyte (a weight ratio among DMC, FEC, and VC is 45:52:3), where the unsaturated metal site of the coordination polymer C in the protective layer complexes with anions $PF_6^-$ the liquid electrolyte, to form a complexation product, and a stable protective layer with a thickness of 13 µm is further obtained.

Comparative Example 1

$LiCoO_2$/Li battery assembly: assembling an unprotected lithium metal anode, a lithium cobaltate anode, and a separator into a button cell, and dropwise adding 50 µL of 1.0 mol/L $LiPF_6$ liquid electrolyte (a weight ratio among DMC, FEC, and VC is 45:52:3).

Comparative Example 2

$LiCoO_2$/Li battery assembly: assembling an unprotected lithium aluminum alloy anode, a lithium cobaltate anode, and a separator into a button cell, and dropwise adding 50 µL of 1.0 mol/L $LiPF_6$ liquid electrolyte (a weight ratio among DMC, FEC, and VC is 45:52:3).

To strongly support the beneficial effects brought by the technical solutions in the embodiments of the present disclosure, the following test is provided.

1. A charge/discharge test is performed, according to the 0.2 C/0.5 C charge/discharge protocol, on the batteries obtained through assembly in Embodiments 1 to 3 of the present disclosure and Comparative Examples 1 and 2, where a voltage range is 3.0 V to 4.5 V, and test results are shown in Table 1 and FIG. 5.

TABLE 1

Performance test results of batteries obtained by assembling different lithium anodes

| No. | Lithium anode type | Capacity retention rate after 100 weeks |
|---|---|---|
| Embodiment 1 | Lithium metal anode protected by A | 92.7% |
| Embodiment 2 | Lithium aluminum alloy anode protected by B | 95.4% |
| Embodiment 3 | Lithium metal anode protected by C | 85.9% |
| Comparative example 1 | Unprotected lithium metal anode | 58.8% |
| Comparative example 2 | Unprotected lithium aluminum alloy anode | 78.8% |

Figure 5:
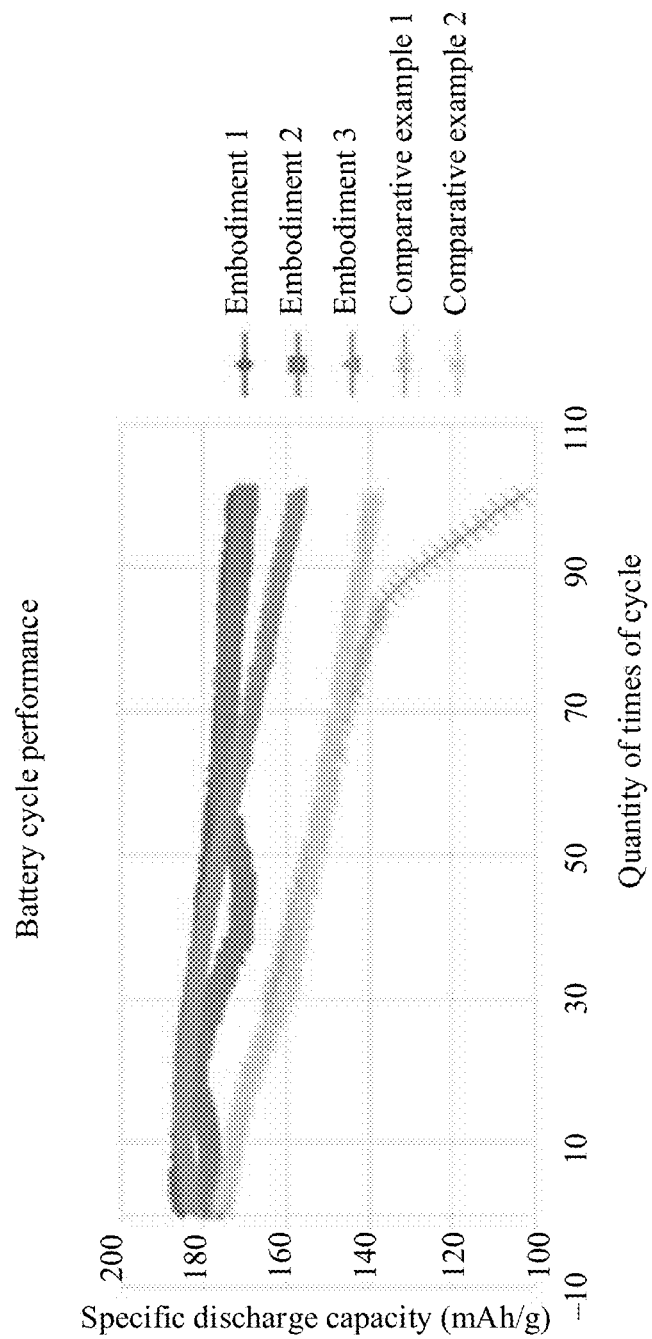
FIG. 5 shows cyclic voltammetries of batteries of Embodiments 1 to 3 of the present disclosure and comparative examples 1 and 2.

It can be learned from the test results in Table 1 and FIG. 5 that capacity retention rates of the lithium cobaltate/lithium batteries in Embodiments 1 to 3 of the present disclosure after 100 weeks are all higher than capacity retention rates of the lithium cobaltate/lithium batteries in Comparative Examples 1 and 2 after 100 weeks. This indicates that the lithium anode protected by the coordination polymer having the unsaturated metal site can be used to significantly improve cycle performance of the battery. This is because the coordination polymer having the unsaturated metal site reacts with the liquid electrolyte, to form a stable complexation product protective layer on a surface of the lithium anode. In one aspect, the metal site (zirconium, aluminum, or iron) in the coordination polymer having the unsaturated metal site and lithium salt anions (hexafluorophosphate) in the liquid electrolyte form the complexation product through complexation, to reduce movements of the hexafluorophosphate anions, increase a transference number of lithium ions, reduce concentration polarization on the surface of the lithium anode, effectively adjust deposition/dissolution of lithium ions of the lithium anode, and inhibit dendrite formation. In addition, a lithium-philic group (carboxyl) in the coordination polymer having the unsaturated metal site may form Li—O chemical bond with the lithium anode. This is beneficial for stabilizing the interface protective layer and alleviating impact caused by volume expansion of the lithium anode in a cycle process. In a further aspect, the protective layer may also serve as a blocking layer, to isolate direct contact between the liquid electrolyte and the lithium anode, to reduce side reactions, and improve coulombic efficiency of the lithium anode.

However, in the unprotected lithium anodes in Comparative Examples 1 and 2, deposition/dissolution of lithium ions of the lithium anode cannot be effectively adjusted due to absence of a protective layer on the surface, resulting in uneven lithium deposition and growth of lithium dendrite, and the exposed lithium anode is in direct contact with the liquid electrolyte. As a result, severe side reactions occur. Consequently, coulombic efficiency of the lithium anode is reduced, and cycle stability of the battery is poor.

Figure 6:
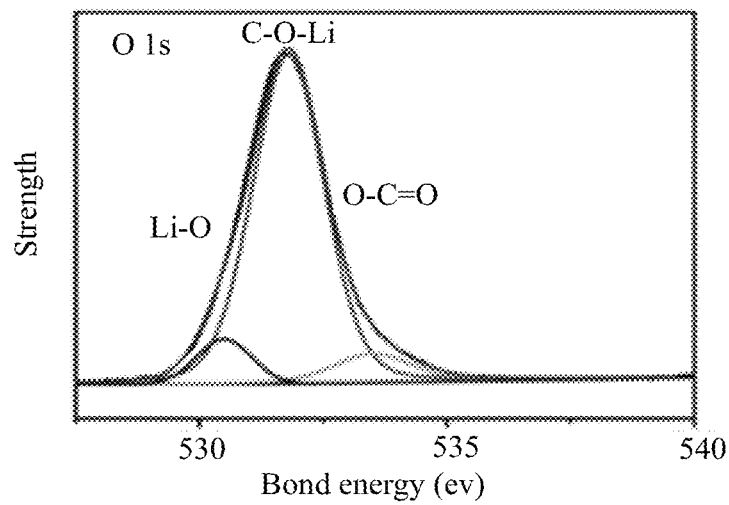
FIG. 6 and FIG. 7 are respectively an O is spectrum and a Li is spectrum of an X-ray photoelectron spectroscopy (XPS) for analyzing a lithium metal anode in Embodiment 1 of the present disclosure.
Figure 7:
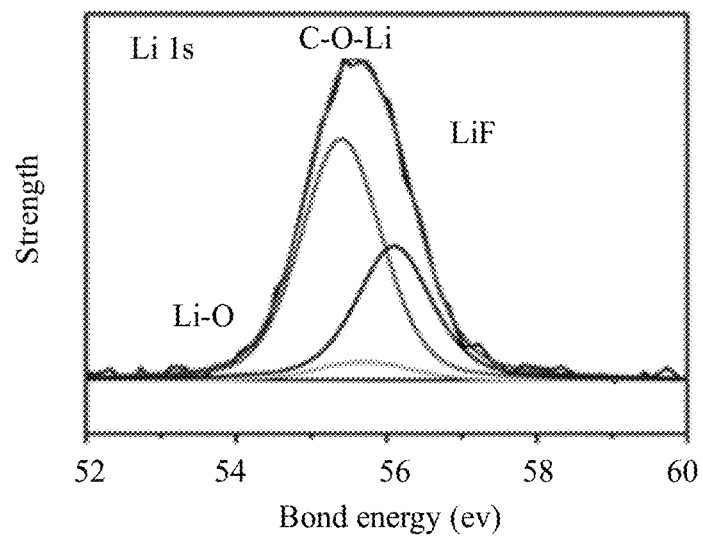

2. The protected lithium anode in Embodiment 1 is analyzed by using an XPS. It can be seen from an O 1 s spectrum in FIG. 6 and a Li 1 s spectrum in FIG. 7 that, there is a component RCOOLi in components on the surface of the protected electrode. This is because the carboxyl in the coordination polymer having the unsaturated metal site may form Li—O chemical bond with the lithium anode.

Figure 8:
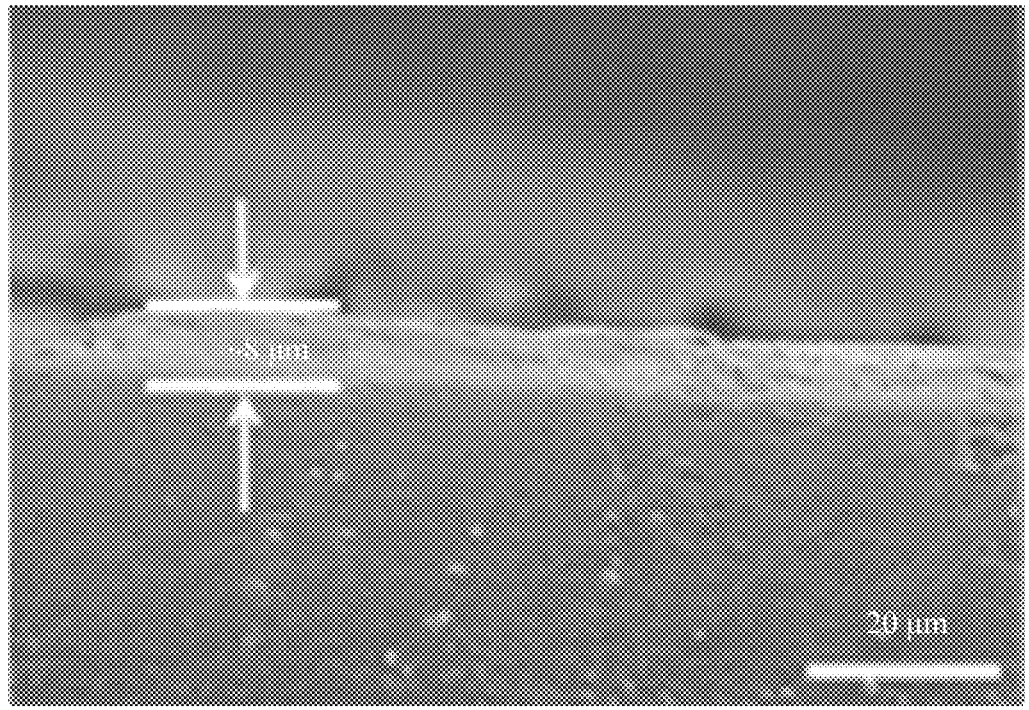
FIG. 8 is a scanning electron microscope (SEM) image of a lithium metal anode in Embodiment 1 of the present disclosure.
Figure 9:
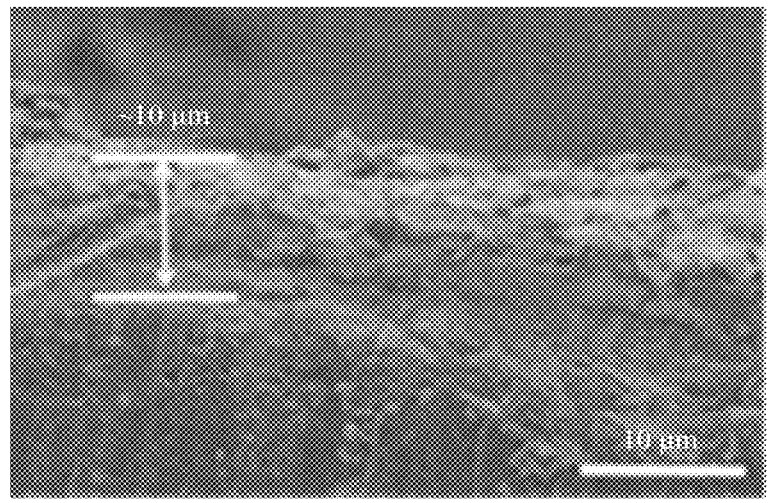
FIG. 9 is an SEM image of a lithium aluminum alloy anode in Embodiment 2 of the present disclosure.
Figure 10:
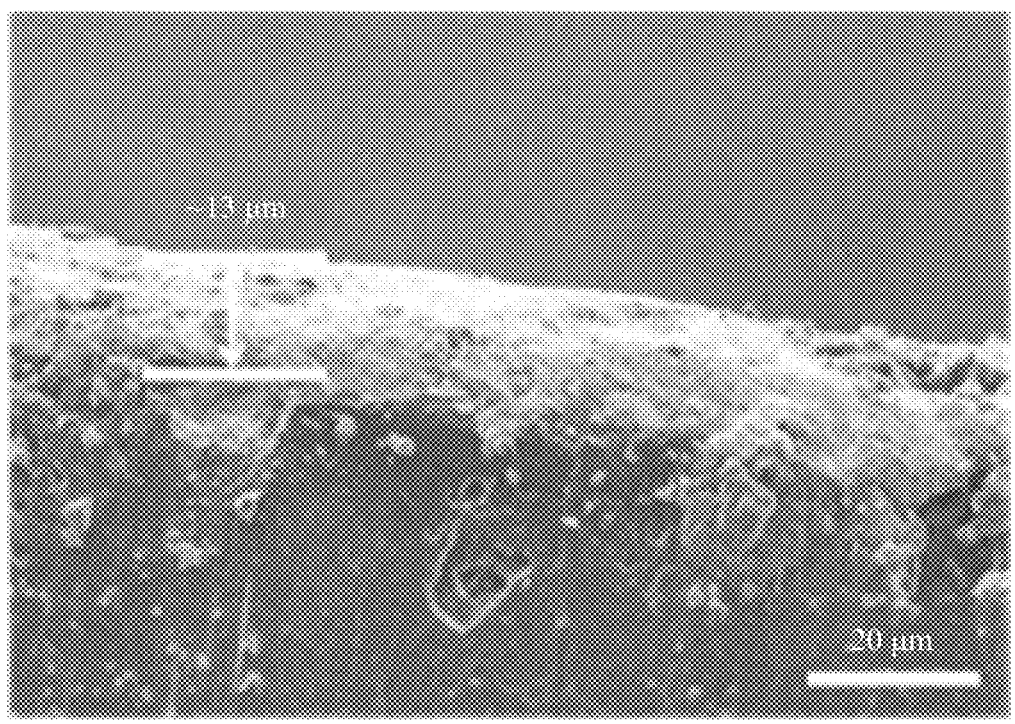
FIG. 10 is an SEM image of a lithium metal anode in Embodiment 3 of the present disclosure.

3. The protected lithium anodes in Embodiments 1 to 3 are observed by using an SEM. It can be seen from SEM images of FIG. 8 to FIG. 10 that, protective layers with thicknesses of 8 µm, 10 µm, and 13 µm are respectively formed on the surfaces of the lithium anodes in Embodiment 1, Embodiment 2, and Embodiment 3, and the protective layers are uniform and compact.

Figure 11:
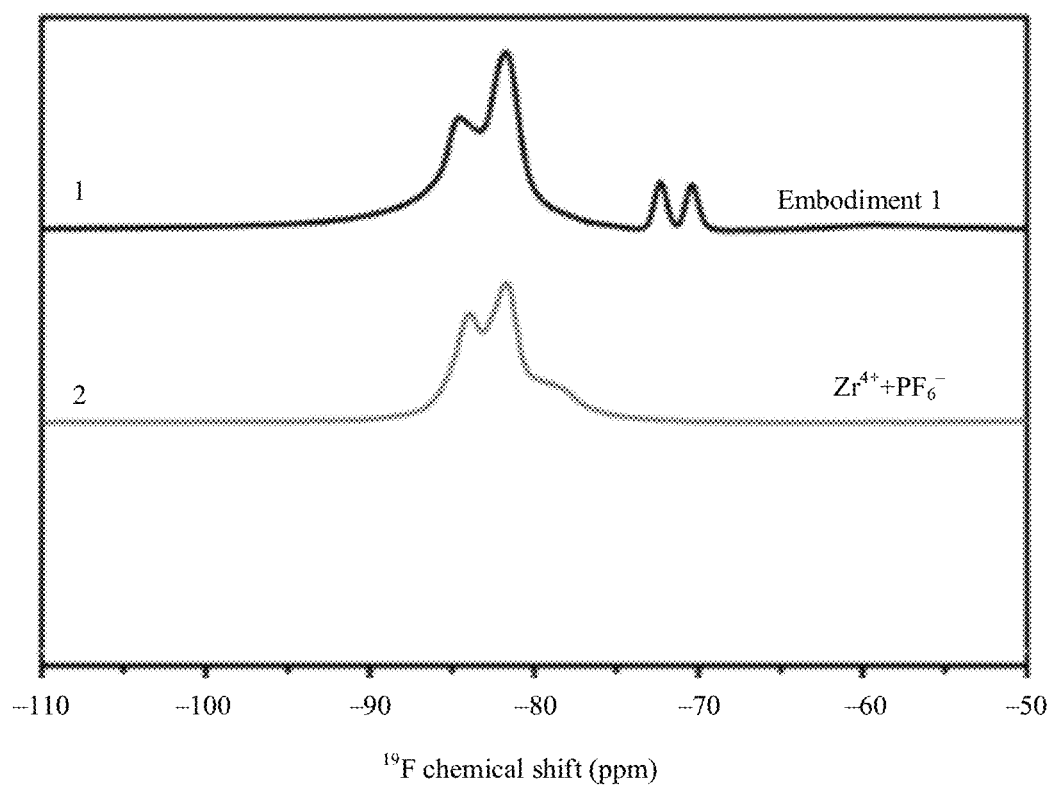
FIG. 11 is a solid-state nuclear magnetic resonance spectrum of a complexation product in a protective layer of Embodiment 1 of the present disclosure.

4. Solid-state nuclear magnetic resonance spectrum analysis is performed on the lithium metal anode after interaction with the liquid electrolyte in Embodiment 1, and a result is shown in FIG. 11. A curve 1 is a sample curve of the lithium metal anode in Embodiment 1 of the present disclosure, and a curve 2 is a curve of a control group of interaction between zirconium and hexafluorophosphate anions. It can be seen from FIG. 11 that, an unsaturated zirconium metal site of the lithium metal anode of Embodiment 1 of the present disclosure forms a strong interaction with the hexafluorophosphate anions in the liquid electrolyte.

What is claimed is:

1. A metal anode comprising:
    a metal anode body comprising two side surfaces; and
    a protective layer formed on the two side surfaces and comprising:
        a coordination polymer having an unsaturated metal site, wherein the coordination polymer uses zirconium, aluminum, or iron as a metal center and uses R—$X_n$ as an organic ligand, wherein R is n-valent hydrocarbyl, substituted hydrocarbyl, or hydrocarboxy, wherein n is an integer in a range of 1 to 4, wherein X is an oxygen-containing functional group capable of forming a metal-oxygen chemical bond with the metal anode body, and wherein the metal-oxygen chemical bond is formed between metal atoms on a surface of the metal anode body and oxygen atoms in X; or
        a complexation product formed by complexation between the coordination polymer and anions of battery electrolyte salt.

2. The metal anode of claim 1, wherein X is carboxyl or sulfonyl, and wherein the unsaturated metal site is monoatomic.

3. The metal anode of claim 1, wherein R is hydrocarbyl, substituted hydrocarbyl, or hydrocarboxy with 1 to 20 carbon atoms, and wherein the organic ligand is aliphatic.

4. The metal anode of claim 3, wherein R comprises one of alkyl, alkylene, haloalkyl, haloalkylene, alkoxy, alkoxylene, haloalkoxy, haloalkoxylene, alkenyl, alkenylene, haloalkenyl, haloalkenylene, enoxy, enoxylene, haloenoxy, halogenated enoxylene, aryl, arylene, haloaryl, haloarylene, aryloxy, aryloxylene, haloaryloxy, or haloaryloxylene.

5. The metal anode of claim 1, wherein the metal anode body comprises a lithium anode, a sodium anode, a potassium anode, a magnesium anode, a zinc anode, or an aluminum anode, wherein the coordination polymer comprises the structure: ZrCOO—R—$X_n$, and wherein the $X_n$ group not bonded to the Zr is bonded to the metal anode body.

6. The metal anode of claim 5, wherein the lithium anode comprises at least one of lithium metal, a lithium silicon alloy, a lithium aluminum alloy, a lithium tin alloy, or a lithium indium alloy.

7. The metal anode of claim 1, wherein the anions comprise at least one of hexafluorophosphate anions, hexafluoroarsenate anions, perchlorate anions, tetrafluoroborate anions, dioxalate borate anions, difluoroacetic acid borate anions, bisfluorosulfonimide anions, bistrifluorosulfonimide anions, or anions complex with the unsaturated metal site.

8. The metal anode of claim 1, wherein a thickness of the protective layer is 0.1 micrometers (µm) to 30 µm.

9. The metal anode of claim 1, wherein the protective layer further comprises a binder.

10. The metal anode according to claim 1, wherein the unsaturated metal site is monoatomic, wherein the unsaturated metal site has a positive charge, wherein the organic ligand is aliphatic, wherein the metal anode body is a lithium negative electrode, and wherein Li—O chemical bonding is formed between the oxygen atoms in the X group and the metal atoms on the surface of the metal anode body.

11. A method for preparing a metal anode comprising:
    forming a protective layer on two side surfaces of a metal anode body,
    wherein the protective layer comprises a coordination polymer having an unsaturated metal site or a complexation product formed by complexation between the coordination polymer and anions of a battery electrolyte salt,
    wherein the coordination polymer uses zirconium, aluminum, or iron as a metal center and uses R—$X_n$ as an organic ligand,
    wherein R is n-valent hydrocarbyl, substituted hydrocarbyl, or hydrocarboxy,
    wherein n is an integer in a range of 1 to 4,
    wherein X is an oxygen-containing functional group capable of forming metal-oxygen chemical bond with the metal anode body, and
    wherein the metal-oxygen chemical bond is formed between metal atoms on a surface of the metal anode body and oxygen atoms in X.

12. The method of claim 11, wherein X is carboxyl or sulfonyl, and wherein the unsaturated metal site has a positive charge.

13. The method of claim 11, wherein the protective layer comprises the coordination polymer, and wherein the method further comprises coating a solution containing the coordination polymer onto the surface of the metal anode body.

14. The method of claim 11, wherein the protective layer comprises the complexation product, and wherein the method further comprises:
    coating a first solution containing the coordination polymer onto the surface of the metal anode body; and
    coating a second solution containing the battery electrolyte salt onto the coordination polymer, wherein the coordination polymer complexes with the anions to form the complexation product.

15. The method of claim 13, wherein the solution comprises a non-aqueous organic solvent comprising one or more of tetrahydrofuran, dimethyl ether, dimethyl sulfide, 1,3-dioxolan, 1,4-dioxane, 1,2-dimethoxyethane, ethylene glycol dimethyl ether, bis-trifluoroethyl, hexafluoroisopropyl methyl ether, hexafluoroisopropyl ethyl ether, methyl perfluorobutyl ether, ethyl perfluorobutyl ether, 1,1,2,2-tetrafluoroethyl-2,2,3,3-tetrafluoropropylether, or 1H, 1H, 5H-perfluoropentyl-1,1,2,2-tetrafluoroethylether.

16. The method of claim 14, wherein the second solution comprises a non-aqueous organic solvent comprising one or more of a carbonate solvent, an ether solvent, or a carboxylate solvent.

17. The method of claim 16, wherein the carbonate solvent comprises:
    cyclic carbonate comprising one or more of ethylene carbonate, propylene carbonate, γ-butyrolactone, butylene carbonate, fluoroethylene carbonate, or vinylene carbonate; or chain carbonate comprising one or more of dimethyl carbonate, ethyl methyl carbonate, diethyl carbonate, or dipropyl carbonate, wherein the ether solvent comprises:
cyclic ether comprising one or more of 1,3-dioxolane, 1,4-dioxane, crown, tetrahydrofuran, 2-methyltetrahydrofuran, or 2-trifluoromethyl tetrahydrofuran; or chain ether comprising one or more of dimethoxymethane, 1,2-dimethoxyethane, or diethylene glycol dimethyl ether, and wherein the carboxylate solvent comprises one or more of methyl acetate, ethyl acetate, propyl acetate, butyl acetate, propyl propionate, or butyl propionate.

18. The method of claim 13, wherein a manner of coating the solution comprises at least one of drip coating, brush coating, roll coating, spray coating, slit coating, dip coating, or spin coating, and wherein the method further comprises further coating the solution in a dry room or in a protective atmosphere.

19. A secondary battery comprising:
a cathode electrode film;
a separator;
a liquid electrolyte; and
an anode electrode film comprising:
a metal anode comprising:
a metal anode body comprising two side surfaces; and
a protective layer formed on the two side surfaces and comprising:
a coordination polymer having an unsaturated metal site, wherein the coordination polymer uses zirconium, aluminum, or iron as a metal center and uses R—$X_n$ as an organic ligand, wherein R is n-valent hydrocarbyl, substituted hydrocarbyl, or hydrocarboxy, wherein n is an integer in a range of 1 to 4, wherein X is an oxygen-containing functional group capable of forming a metal-oxygen chemical bond with the metal anode body, and wherein the metal-oxygen chemical bond is formed between metal atoms on a surface of the metal anode body and oxygen atoms in X; or
a complexation product formed by complexation between the coordination polymer and anions of battery electrolyte salt.

20. A terminal comprising:
a secondary battery configured to supply power to the terminal, wherein the secondary battery comprises:
a separator;
a liquid electrolyte; and
an anode electrode film comprising:
a metal anode comprising:
a metal anode body comprising one or two side surfaces; and
a protective layer formed on the one or two side surfaces and comprising:
a coordination polymer having an unsaturated metal site, wherein the coordination polymer uses zirconium, aluminum, or iron as a metal center and uses R—$X_n$ as an organic ligand, wherein R is n-valent hydrocarbyl, substituted hydrocarbyl, or hydrocarboxy, wherein n is an integer in a range of 1 to 4, wherein X is an oxygen-containing functional group capable of forming a metal-oxygen chemical bond with the metal anode body, and wherein the metal-oxygen chemical bond is formed between metal atoms on a surface of the metal anode body and oxygen atoms in X; or
a complexation product formed by complexation between the coordination polymer and anions of battery electrolyte salt.

* * * * *